Patented Apr. 18, 1950

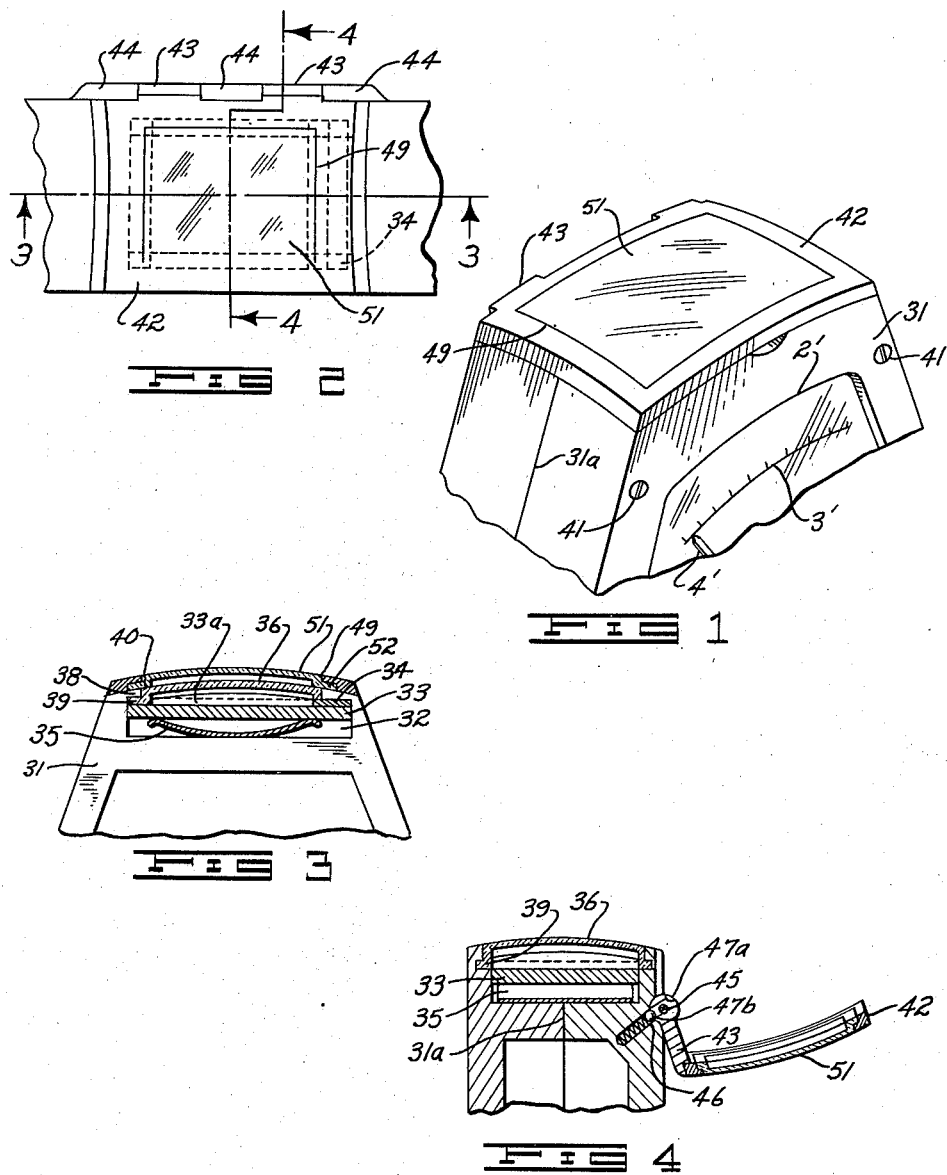

2,504,346

UNITED STATES PATENT OFFICE 2,504,346

DUAL RANGE EXPOSURE METER HAVING A LIGHT-DIFFUSING PIVOTED COVER

Donald W. Norwood, Pasadena, Calif.

Application July 17, 1948, Serial No. 39,288

1 Claim. (Cl. 88—23)

This invention relates to an exposure meter for photographic use, adapted to provide an appraisal of the value of incident light for use in the determination of the optimum photographic exposure of a given photo-sensitive material.

One of the particular objects of the invention is to provide a device having a high angular acceptance to light, in the neighborhood of and slightly greater than $2\pi$ steradians, and adapted for measuring incident light in two different light intensity ranges, whereby the meter may be used to measure a large range of incident light intensity.

A further object of the invention is to provide an exposure meter having a high angular acceptance to light, provided with external range-changing means serving to change the measuring range of the instrument without affecting the angular light acceptance of the device, whereby the incident light values obtained in the different ranges are comparable with each other for photographic purposes.

A further object of the invention is to provide a device of the character described, which is of compact size and may be provided with a single light-intensity scale, together with range-changing means adapted to alter the sensitivity of the device in such manner that different light intensities may be read on that scale subject to a certain preselected factor such as a factor of ten or one hundred, for the readings in one of the ranges.

A particular object of the invention is to provide a dual range exposure meter adapted for measuring the intensity of light incident upon a photographic subject over a solid angle in the neighborhood of and slightly greater than $2\pi$ steradians, in which the angle of light acceptance of the meter is substantially the same for both ranges.

This application is a continuation-in-part of my forfeited application Ser. No. 588,539, filed April 16, 1945.

Other advantages and objects of the invention will be brought out in the ensuing description or will be apparent from such description in connection with the accompanying drawings, in which:

Fig. 1 is a perspective view of the light receiving end portion of a light meter in accordance with this invention, with the range-changing cover member in closed position;

Fig. 2 is a plan view thereof, as viewed from above in Fig. 1;

Fig. 3 is a sectional view on line 3—3 in Fig. 2; and

Fig. 4 is a sectional view on line 4—4 in Fig. 2, with the cover member shown in open position.

The device is shown as comprising a casing 31 of any desired shape, provided at one end with a recess 32 in which the light responsive element is disposed. The casing 31 is also provided with a current measuring device located within the casing, such as a microammeter, and with a transparent window 2 permitting the viewing of a light intensity scale 3 and the microammeter pointer 4.

A light responsive element 33 is mounted within the recess 32 adjacent said one end of the casing, and is provided with an upper or front electrode 34 engaging the front surface of said element at one end thereof, and a lower or back electrode 35, preferably of a spring type, engaging the rear surface of said element, said electrodes being connected to the current generating device as is common in exposure meters employing photosensitive cells.

Overlying the light responsive element 33. I have provided a translucent light-diffusing window member 36 whose inner and outer faces have a slight outwardly convex curvature. Said window 36 may, for example, be formed of translucent light diffusing plastic, such as milk celluloid or the like, or of diffusing glass, and preferably has a relatively high light-transmitting power, for example, a 50% light transmission characteristic, and may be held in position by a flange 38 on casing 31 projecting inwardly from the walls of recess 32 and engaging cooperating flanges 39 on the window 36. The flanges 38 define a central opening 40 at the end of the casing, within which the window 36 is disposed, so that the outer surface of window 36 is adapted to receive light incident thereon in directions throughout a solid angle in the neighborhood of and slightly greater than $2\pi$ steradians. The light so received by said window is diffused and transmitted inwardly to the outer light-receiving surface 33a of light responsive element 33, located inwardly of the flanges 38 and the front electrode 34.

In order to permit assembly of the device with the window 36 secured in position as above described, the casing 31 is preferably split longitudinally along a central plane, as indicated at 31a, so as to provide two casing halves which may be secured together by means of retaining screws 41.

A range-changing cover 42 is hingedly mounted on the casing 31 by means of lugs 43 on the cover and lugs 44 on the casing, pivotally interconnected by hinge pin 45. Said cover 42 is mounted at the same end of the casing as the window 36, and is movable about the hinge axis defined by pin 45, to a closed or operative position overlying said window, as shown in Figs. 1 through 3, and to open or inoperative position away from said window, as shown in Fig. 4. The angular movement of said cover away from its closed position permitted by the hinged mounting thereof is preferably sufficient so that, when in the full open position of Fig. 4, the cover is entirely removed from the solid angle of light acceptance of the curved window 36, whereby said window is exposed to reception of exterior light in directions throughout the aforesaid solid angle slightly greater than $2\pi$ steradians.

In order to releasably retain the cover 42 in either full closed or full open position, I have shown the casing as provided with latch means in the form of a spring-pressed ball 46 adapted to engage a small notch 47a in one of the hinge lugs 43 when the cover is in closed position, and to engage a notch 47b in said lug, as shown in Fig. 4, when the cover is in its full open position.

The cover 42 may be of metal, plastic, or other opaque material and is provided with a central opening 49 of substantially the same size and shape as the opening 40 in the casing. A translucent light-diffusing window 51, of substantially the same shape, area, and convex surface configuration as the fixed window 36, is fitted within said opening 49 in the cover, and may be provided with a peripheral flange 52 engaging a recess in said cover around said opening. The window 51 is secured to said cover in any suitable manner, as by cementing it thereto. The opaque cover 42 extends completely around the opening 49 and window 51 and is adapted to closely engage the end wall of casing 31 when in closed position so as to prevent access of exterior light to the inner window 36 between said cover and the casing and thereby restrict illumination of the light-responsive element 33 to light passing through the outer window 51.

The window 51 may, for example, be also formed of milk celluloid or other translucent light-diffusing plastic material or of diffusing glass, having a light-transmitting power sufficiently low to reduce the indications of light quantity to the desired value when the cover is in closed position. For example, if it is desired to reduce the indications of light quantity, with the cover closed, to one-tenth the indications produced by light of the same intensity when the cover is open, the window 51 should be made to have a light-transmission characteristic of 10%.

In one particular form of this device, each of the windows 36 and 51 is curved convexly in each of two planes that are perpendicular to each other and perpendicular to the surface of the window at the center of the window, said planes passing through the longitudinal and transverse central axes of the windows, and the curvature in each of these planes is such as to subtend an angle of approximately 12° at the center of curvature. With this arrangement, the outer surface of each window is adapted to receive light incident thereon in directions throughout a solid angle of approximately $2.2\pi$ steradians.

The device may be used for taking incident light measurements in either of two different ranges of light intensity, with the cover member 42 in fully open position and fully closed position, respectively.

When the cover 42 is in the fully open position shown in Fig. 4, the window 36 is open to access of exterior light incident thereon in directions throughout the above mentioned solid angle somewhat greater than $2\pi$ steradians, and such incident light is transmitted to the full area of the light-receiving surface 33a of the light-responsive element 33, causing said element to produce a relatively large indication of light quantity by the associated microammeter pointer, for a given intensity of illumination. When the cover 42 is swung to its fully closed position overlying the window 36, the outer window 51 will receive light incident thereon in directions throughout the same solid angle as before, and will transmit a given portion of such light through the inner window 36 to the full light receiving area of the light-responsive element 33. The proportion of the light so transmitted inwardly by the outer window 51 is determined by its light-transmitting power, which as noted above is so selected as to give the desired reduction in the indications of light quantity when the cover is closed, as compared with the indications for the same incident light intensity with the cover open.

In the specific example mentioned above, in which the outer window 51 has a light-transmitting characteristic of 10%, the indications obtained with the cover closed will be one-tenth as great as with the cover open, for the same intensity of illumination. Thus, if the device is made to provide indications of illumination in the range from 2.5 to 1280 foot-candles when the cover is open, it may be used to measure light values in the range from 25 to 12,800 foot-candles when the cover is closed.

The light on a photographic subject is provided not only by the direct light of the main light source but by light from other directions which reinforces the illumination of the portions of the subject which are facing the camera. In using the incident light meter of this invention, the effectiveness of this illumination for photographic purposes is determined by measuring the light falling upon the light-receiving surface of the light-responsive element when the device is located at the position of the photographic subject with the light-receiving end of the device (i. e., the upper end as shown in the drawings) directed toward the position of the main source of illumination. Since the two windows 36 and 51 are of the same size and convex curvature, and since both of these windows are translucent light-diffusing members and are so positioned as to transmit the incident light inwardly to the full light-receiving area of the light-responsive element 33, it will be seen that the angular light-receiving characteristic of the instrument is maintained equal and slightly greater than $2\pi$ steradians in both the open and closed positions of the movable cover member 42. I have found that this ability of the device to receive and measure the incident illumination over this wide angle of acceptance in both the high-intensity and low-intensity ranges is advantageous in that it provides a more satisfactory measurement of the total illumination intensity, including not only the light from the main source of illumination but also light from other sources that assist in illuminating the portion of a photographic subject which is directed toward the main source of illumination.

I claim:

An exposure meter for measuring the intensity of incident light in two different ranges of light intensity, comprising: a casing provided with a first translucent light-diffusing window at one end thereof; a light-responsive element within said casing adjacent said one end and having a light-receiving surface positioned to receive light transmitted by said window; said window having a slight outwardly convex curvature and being so positioned with respect to said casing and said light-responsive element as to receive, and transmit to substantially the full area of said light-receiving surface, exterior light incident upon said window in directions throughout a solid angle in the neighborhood of and slightly greater than $2\pi$ steradians; an indicating member associated with said light-responsive element for producing a visible indication of the quantity of light incident upon said light-receiving surface of the light-responsive element; an opaque cover hingedly mounted on said casing for movement to a first position covering said window and a second position substantially fully exposing said window to the reception of light throughout said solid angle, said cover being provided with a second translucent light-diffusing window disposed outwardly of said first window when said cover is in said first position; said second window having its outer surface disposed substantially at the outer face of said cover and having substantially the same shape, area and convex curvature as said first window and being so positioned as to receive exterior light incident thereupon in directions throughout substantially the same solid angle in the neighborhood of and slightly greater than $2\pi$ steradians, and to transmit a portion of all such incident light through said first window to substantially the full area of said light-receiving surface of the light-responsive element; said cover engaging said casing around said first window when in said first position in such manner as to substantially prevent access of exterior light to said first window otherwise than by transmission through said second window; and said second window having a sufficiently low light-transmitting power to reduce the indication of light quantity produced by said light responsive element and the associated indicating member when said cover is in said first position to a value materially less than that produced by exterior light of the same intensity when said cover is in said second position.

DONALD W. NORWOOD.

REFERENCES CITED

The following references are of record in the file of this patent:

UNITED STATES PATENTS

| Number | Name | Date |
| --- | --- | --- |
| 1,990,361 | Bailey | Feb. 5, 1935 |
| 2,143,500 | Smethurst | Jan. 10, 1939 |
| 2,156,734 | McCune | May 2, 1939 |
| 2,274,441 | Williams | Feb. 24, 1942 |
| 2,278,338 | Tonnies | Mar. 31, 1942 |

FOREIGN PATENTS

| Number | Country | Date |
| --- | --- | --- |
| 416,553 | Great Britain | Sept. 17, 1934 |